United States Patent
Dai et al.

(10) Patent No.: US 11,476,771 B2
(45) Date of Patent: Oct. 18, 2022

(54) SYSTEM AND METHOD FOR POWER CONVERSION

(71) Applicant: ABB Schweiz AG, Baden (CH)

(72) Inventors: Ke Dai, Wuhan (CN); Derong Lin, Wuhan (CN); Chengjing Li, Wuhan (CN); Tian Tan, Wuhan (CN); Tinho Li, Hong Kong (CN); Kai Tian, Xingtai (CN)

(73) Assignee: ABB SCHWEIZ AG, Baden (CH)

(*) Notice: Subject to any disclaimer, the term of this patent is extended or adjusted under 35 U.S.C. 154(b) by 221 days.

(21) Appl. No.: 17/073,678

(22) Filed: Oct. 19, 2020

(65) Prior Publication Data

US 2021/0036628 A1 Feb. 4, 2021

Related U.S. Application Data

(63) Continuation of application No. PCT/CN2018/083787, filed on Apr. 19, 2018.

(51) Int. Cl.
  *H02M 5/458* (2006.01)
  *H02M 1/14* (2006.01)
  *H02P 27/08* (2006.01)

(52) U.S. Cl.
  CPC .......... *H02M 5/4585* (2013.01); *H02M 1/14* (2013.01); *H02P 27/08* (2013.01)

(58) Field of Classification Search
  CPC ........ H02M 5/4585; H02M 1/14; H02M 1/15; H02M 1/0077; H02M 7/2195; H02M 7/49; H02P 27/08
  USPC .......................................................... 363/35
  See application file for complete search history.

(56) References Cited

U.S. PATENT DOCUMENTS

| 7,336,509 B2 | 2/2008 | Tallam |
| 9,136,790 B2 | 9/2015 | Park et al. |
| 2015/0162859 A1* | 6/2015 | Becerra ................... H02P 21/24 318/400.23 |

(Continued)

FOREIGN PATENT DOCUMENTS

| CN | 101022261 A | 8/2007 |
| CN | 105577060 A | 5/2016 |

(Continued)

OTHER PUBLICATIONS

Intellectual Property Office of the P.R. China, International Search Report & Written Opinion issued in corresponding Application No. PCT/CN2018/083787, dated Jan. 18, 2019, 9 pp.

(Continued)

*Primary Examiner* — Emily P Pham
*Assistant Examiner* — Htet Z Kyaw
(74) *Attorney, Agent, or Firm* — Greenberg Traurig, LLP

(57) ABSTRACT

A system and a method for power conversion. The system includes a rectifier; an inverter; a DC-link capacitor coupled between the rectifier and the inverter; and a controller. The controller is configured to obtain a current value at an output of the inverter and a voltage value across the DC-link capacitor, determine an average component and a fluctuating component of an output voltage of the inverter based on the obtained current value and the voltage value, and determine a current reference for controlling the rectifier based on the average component and the fluctuating component of the output voltage.

23 Claims, 4 Drawing Sheets

(56) References Cited

U.S. PATENT DOCUMENTS

| | | | |
|---|---|---|---|
| 2015/0180384 A1 | 6/2015 | An et al. | |
| 2017/0366082 A1* | 12/2017 | Liu | H02M 1/4216 |
| 2019/0149055 A1* | 5/2019 | Tomita | H02M 3/33573 363/17 |

FOREIGN PATENT DOCUMENTS

| | | |
|---|---|---|
| CN | 106559026 A | 4/2017 |
| CN | 106655913 A | 5/2017 |

OTHER PUBLICATIONS

Gu et al., "Means of Eliminating Electrolytic Capacitor in AC/DC Power Supplies for LED Lightings," IEEE Transactions on Power Electronics, vol. 24, No. 5, May 2009, pp. 1399-1408.

Jung et al., "DC-Link Voltage Stabilization and Source THD Improvement using d-axis Current Injection In Reduced DC-Link Capacitor System," IECON 2016—42nd Annual Conference of the IEEE Industrial Electronics Society, Oct. 23-26, 2016, Florence, Italy, pp. 2737-2742.

Perez et al., "Regenerative Medium-Voltage AC Drive Based on a Multicell Arrangement With Reduced Energy Storage Requirements," IEEE Transactions on Industrial Electronics, vol. 52, No. 1, Feb. 2005, pp. 171-180.

Liutanakul et al., "DC-link capacitor reduction of a controlled rectifier supplying N inverter-motor drive systems by compressing the load variations," IEEE Power Electronics Specialists 35th Annual Conference (Jun. 2004), AAchen, Germany (6 pages).

European Extended Search Report for EP Application No. 18915518.7 dated Oct. 8, 2021.

* cited by examiner

SYSTEM AND METHOD FOR POWER CONVERSION

FIELD

Embodiments of the present disclosure generally relate to the field of electrical power, and in particular, to system and method for power conversion.

BACKGROUND

For a power conversion system, especially an electric drive system, it is very important to reduce the voltage ripple on the DC-link capacitor. With a reduced voltage ripple, the size and cost of the capacitor may be substantially reduced and the life cycle of the capacitor may be substantially prolonged. However, current solutions cannot reduce the DC-link voltage ripple very effectively.

Currently, there is a solution for use in an electric drive system that takes the output power into account to reduce the size of the DC-link capacitor by reducing the second current harmonic that circulates into the DC-link capacitor. For example, the output power of the inverter as well as the voltage across the DC-link capacitor is fed back to the controller of the rectifier to reduce the ripple across the DC-link capacitor.

However, there is a need for a more effective solution for reducing DC-link ripple in a power conversion system.

SUMMARY

In general, example embodiments of the present disclosure provide a power conversion system and a method and device for controlling a power conversion system.

In a first aspect, there is provided a system. The system comprises a rectifier; an inverter; and a DC-link capacitor coupled between the rectifier and the inverter. A controller is configured to: obtain a current value at an output of the inverter and a voltage value across the DC-link capacitor, determine an average component and a fluctuating component of an output power of the inverter based on the obtained current and voltage values, and determine a current reference for controlling the rectifier based on the average component and the fluctuating component of the output power.

In accordance with the embodiments of the present disclosure, if the same DC-link capacitor is applied, the DC-link voltage ripple will be reduced and if the DC-link voltage ripple is designed at the same voltage level, the DC-link capacitance will be reduced. Reduced DC-link voltage ripple would be helpful to decrease the capacitor temperature rise and prolong the life of the capacitor. Reduced DC-link capacitance may also help decrease the size, weight, and/or cost of the system.

In some embodiments, the controller comprises a de-coupler configured to decouple the average component of the output power from the fluctuating component of the output power. In this way, the average component and the fluctuating component can be separated from each other.

In some embodiments, the de-coupler comprises: a moving average filter (MAF) configured to output the average component of the output power based on the output power; and an adder coupled to the MAF and configured to output the fluctuating component by subtracting the average component from the output power. By applying a MAF, the average component of the output power may be effectively determined based on the moving average of the output power.

In some embodiments, the controller comprises: a first controller unit configured to determine a first current from the average component of the output power; and a second controller unit configured to determine a second current from the fluctuating component of the output power. By independently controlling based on the average component and the fluctuating component of the output power, the design flexibility will be substantially promoted.

In some embodiments, the controller comprises an adder configured to add the first and second currents to obtain a combined current. The controller is further configured to determine the current reference based on the combined current. By combining the two currents, both the independently controlled components will be taken into account in the control system to improve the performance thereof.

In some embodiments, at least one of the first and second controller units is a Proportional Controller. By applying a proportional controller, the design of the system will be greatly simplified, since the proportional gain may be determined in an analytical representation.

In some embodiments, the rectifier is a three-phase rectifier and the inverter is a single-phase inverter. The mismatch between the three-phase rectifier and the single-phase inverter would substantially entail the control solution and improve the performance of the control solution.

In some embodiments, the controller is further configured to adjust the rectifier to have an input current that tracks the current reference.

In a second aspect, there is provided a method. The method comprises obtaining a current value at an output of an inverter and a voltage value across a DC-link capacitor, the DC-capacitor coupled between a rectifier and the inverter; determining an average component and a fluctuating component of an output power of the inverter based on the obtained current and voltage values, and determining a current reference for controlling the rectifier based on the average component and the fluctuating component of the output power.

In some embodiments, determining the average component and the fluctuating component of the output power comprises: decoupling the average component of the output power from the fluctuating component of the output power.

In some embodiments, decoupling the average component from the fluctuating component comprises: determining the average component of the output power based on the output power by a moving average filter (MAF); and determining the fluctuating component by decreasing the average component from the output power.

In some embodiments, determining the current reference comprises: determining a first current from the average component of the output power, and determining a second current from the fluctuating component of the output power.

In some embodiments, determining the current reference comprises: adding the first and second currents to obtain a combined current; and determining the current reference based on the combined current.

In some embodiments, determining the first current comprises multiplying the average component of the output power with a first proportional gain, and wherein determining the second current comprises multiplying the fluctuating component of the output power with a second proportional gain.

In some embodiments, the rectifier is a three-phase rectifier and the inverter is a single-phase inverter.

In some embodiments, the method further comprises causing an input current of the rectifier to track the current reference.

In a third aspect, there is provided a controller. The controller comprises a de-coupler configured to: receive a current value at an output of an inverter and a voltage value across a DC-link capacitor, the DC-capacitor coupled between a rectifier and the inverter; and decouple the average component of an output power from the fluctuating component of the output power, the output power being determined based on the received current and voltage values. The controller is configured to determine a current reference for controlling the rectifier based on the average component and the fluctuating component of the output power.

In some embodiments, the de-coupler comprises: a moving average filter (MAF) configured to output the average component of the output power based on the output power; and an adder coupled to the MAF and configured to output the fluctuating component by subtracting the average component from the output power.

In some embodiments, the controller further comprises a first controller unit configured to determine a first current from the average component of the output power, and a second controller unit configured to determine a second current from the fluctuating component of the output power.

In some embodiments, the controller further comprises an adder configured to add the first and second currents to obtain a combined current. The controller is further configured to determine the current reference based on the combined current.

In some embodiments, at least one of the first and second controller units is a Proportional Controller.

In some embodiments, the rectifier is a three-phase rectifier and the inverter is a single-phase inverter.

In some embodiments, the controller is further configured to adjust the rectifier to have an input current that tracks the current reference.

The method and device for controlling the power conversion system may achieve similar technical effects to the power conversion system as described above. For the sake of clarity, the technical effects and benefits are not elaborated here.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
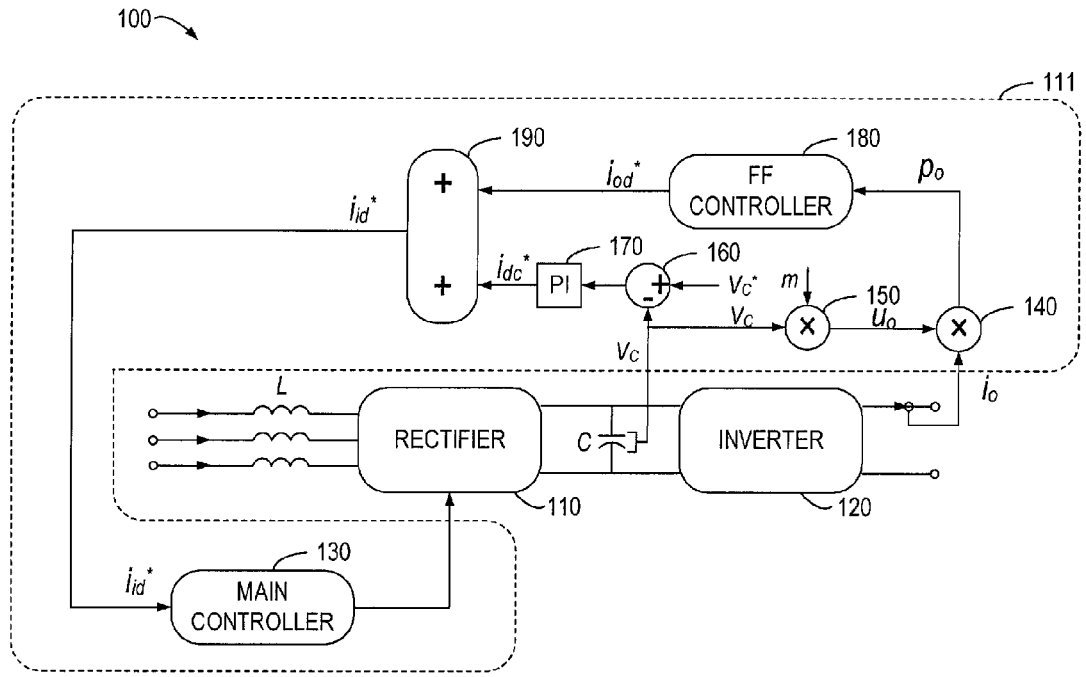
FIG. 1 is a schematic diagram illustrating a power conversion system including a power cell and a controller in accordance with embodiments of the present disclosure.

FIG. 1 is a schematic diagram illustrating a power conversion system 100 in accordance with embodiments of the present disclosure. The power conversion system 100 includes a power cell including a rectifier 110 and an inverter 120. As shown in FIG. 1, the rectifier 110 may be a three-phase rectifier coupled to an alternating current (AC) grid via three separate inductors L. The rectifier 110 may receive electrical power from the AC grid and convert the AC power into direct current (DC) power. The DC voltage is applied across a DC-link capacitor C coupled between the rectifier 110 and the inverter 120. The DC voltage is supplied to the inverter 120 configured to convert the DC power into an AC power. The inverter 120 may be a single-phase inverter configured to drive a load such as a motor. It is to be understood that any other suitable rectifier or inverter may be applicable, although the power conversion system 100 is described with reference to a three-phase rectifier and a single-phase inverter.

As shown in FIG. 1, the rectifier 110 may be an active rectifier to be controlled by a controller 111. The controller 111 includes a feedback loop configured to provide a current reference $i_{id}^*$ to a main controller 130. The main controller 130 may be configured to adjust the rectifier 110 to have an input current from the grid to track the current reference.

The controller 111, in particular, the feedback loop, may receive a voltage value $V_C$ across the DC-link capacitor C and a current value $i_o$ at an output of the inverter 120. The feedback loop may determine an average component and a fluctuating component of an output power $p_o$ of the inverter 120 based on the received current and voltage values $i_o$ and $V_C$. The feedback loop may determine a current reference $i_{id}^*$ for controlling the rectifier 110 based on the average component and the fluctuating component of the output power $p_o$.

As shown in FIG. 1, the voltage value $V_C$ may be supplied to a multiplier 150, which multiplies the voltage value $V_C$ with a modulation index m of the inverter 120 to obtain the output voltage $u_o$ of the inverter 120. The output voltage $u_o$ is then multiplied at a multiplier 140 with the current value $i_o$ measured at the output of the inverter 120 to determine the output power $p_o$, which is provided to the feed forward controller 180 for further processing.

Additionally, the voltage value $V_C$ is provided to an adder 160, which subtracts the voltage value $V_C$ from the voltage reference $V_C^*$ of the DC-link capacitor C. The difference is provided to a proportional integral controller 170, which calculates a current reference $i_{dc}^*$. The adder 190 combines the current references $i_{dc}^*$, and $i_{od}^*$ so as to obtain the current reference $i_{id}^*$. The current reference $i_{id}^*$ is then provided to the main controller 130, as described above.

Figure 2:
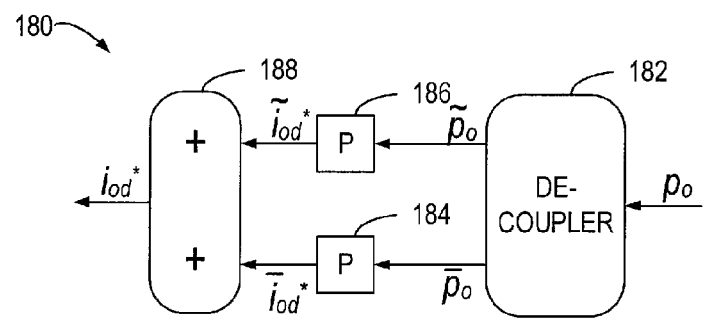
FIG. 2 is a schematic diagram illustrating a feed forward controller in accordance with embodiments of the present disclosure.

The feed forward controller 180 may obtain the output power $p_o$ and determine the current reference $i_{od}^*$ based on the output power $p_o$. FIG. 2 is a block diagram illustrating a feed forward controller 180 in accordance with embodiments of the present disclosure. The feed forward controller 180 includes a de-coupler 182 configured to decouple the average component $\bar{p}_o$ of the output power $p_o$ from the fluctuating component $\tilde{p}_o$ of the output power $p_o$. As shown in FIG. 2, the de-coupler 182 may output the average component $\bar{p}_o$ and the fluctuating component $\tilde{p}_o$ of the output power $p_o$. The average component $\bar{p}_o$ may be supplied to a controller 184, which may determine a first current from the average component $\bar{p}_o$ of the output power $p_o$. The fluctuating component $\tilde{p}_o$ is supplied to a controller 184, which may determine a second current from the fluctuating component $\tilde{p}_o$ of the output power $p_o$. As shown in FIG. 2, at least one of the controllers 184 and 186 may be a proportional controller.

As shown in FIG. 2, the controller 180 includes an adder 188 configured to add the first and second currents to obtain a combined current. The combined current may be supplied to the adder 190 as shown in FIG. 1 in order to determine the current reference $i_{id}^*$.

Figure 3:
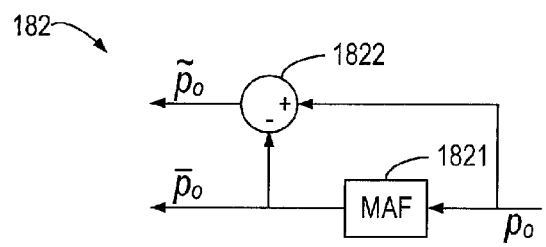
FIG. 3 is a schematic diagram illustrating a de-coupler in accordance with embodiments of the present disclosure.

FIG. 3 is a schematic diagram illustrating a de-coupler 182 in accordance with embodiments of the present disclosure. The de-coupler 182 includes a moving average filter (MAF) 1821 configured to output the average component $\bar{p}_o$ of the output power $p_o$ based on the output power $p_o$. The MAF 1821 may determine a moving average of the output power $p_o$. An adder 1822 is coupled to the MAF 1821 and is configured to output the fluctuating component $\tilde{p}_o$ by subtracting the average component $\bar{p}_o$ from the output power $p_o$.

Figure 4:
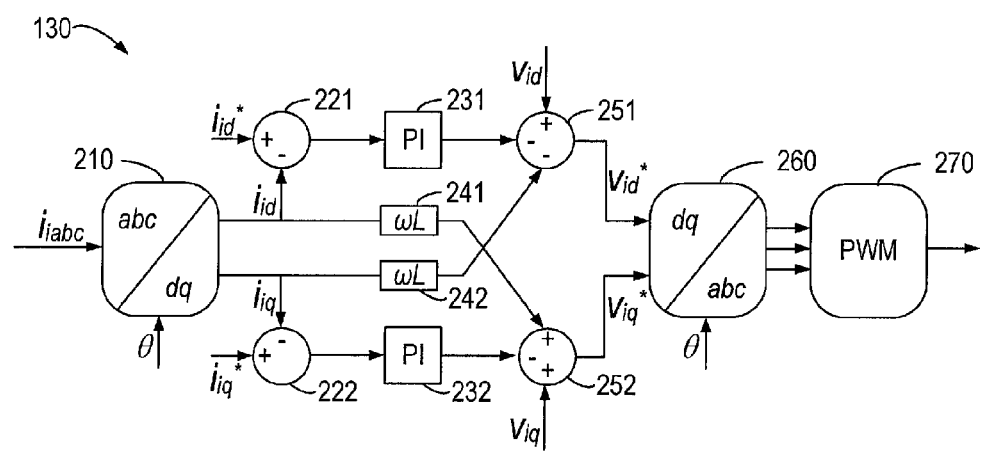
FIG. 4 is a schematic diagram illustrating a main controller in accordance with embodiments of the present disclosure.

FIG. 4 is a schematic diagram illustrating a main controller 130 in accordance with embodiments of the present disclosure. It is to be understood that the main controller 130 is described for an illustrative purpose only and that any other suitable controller currently known or to be developed in the future may be applicable. In the main controller 130, the active and reactive currents $i_{id}$, $i_{iq}$ at the grid side in dq frame are adjusted to track the specified current reference $i_{id}^*$, $i_{iq}^*$, respectively. The active current reference $i_{id}^*$ may be obtained from the feedback loop as shown in FIG. 1, while the reactive current reference $i_{iq}^*$ may be set to be zero, for example.

The Park transformation block 210 may receive three phase current values $i_{iabc}$ measured at the grid side and transform the currents $i_{iabc}$ in abc frame into currents $i_{id}$ and $i_{iq}$ in dq frame. The Park transformation block 210 may be controlled by a rotation angle θ. The active current $i_{id}$ may be filtered at a filter 241 to filter out disturbances and then supplied to an adder 252. The reactive current $i_{iq}$ may be filtered at a filter 242 to filter out disturbances and then supplied to an adder 251. The adder 221 may receive the current reference $i_{id}^*$ and the active current value $i_{id}$, and determine a difference between the current reference $i_{id}^*$ and the active current value $i_{id}$. The difference is provided to a proportional integral (PI) controller 231 and then to an adder 251. The adder 251 further receives a voltage value $V_{id}$ at the grid side and subtracts the outputs of the PI controller 231 and a filter 242 from the voltage value $V_{id}$ so as to obtain a voltage reference $V_{id}^*$.

The adder 222 obtains the reactive current reference $i_{iq}^*$ and the reactive current $i_{iq}$, and determines a difference between the current reference $i_{iq}^*$ and the reactive current $i_{iq}$. The difference is provided to a PI controller 232 and then to an adder 252. The adder 252 further receives a reactive voltage $V_{iq}$ at the grid side and subtracts the output of the PI controller 232 from a sum of the reactive voltage $V_{iq}$ and the output of the filter 241 so as to obtain a voltage reference $V_{iq}^*$.

The voltage references $V_{id}^*$ and $V_{iq}^*$ are provided to a Park inverse transformation block 260, which transforms the voltage references from dq frame to abc frame. The Park inverse transformation block 260 is also controlled by the rotation angle θ. A pulse width modulation (PWM) controller 270 receives the voltages references in abc frame and generates on/off control signals for the switches in the rectifier 110.

Figure 5:
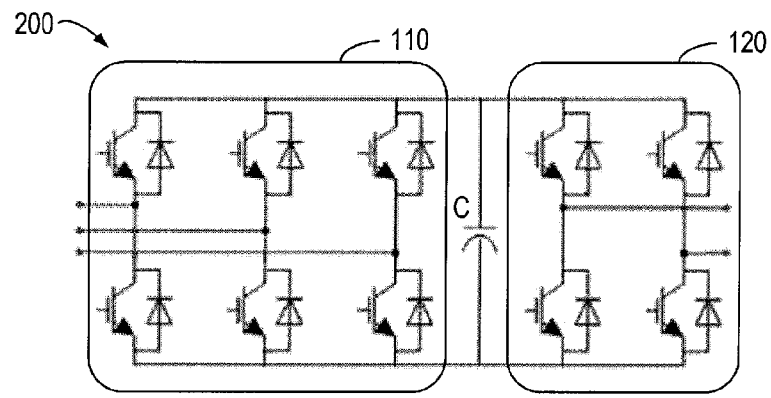
FIG. 5 is a circuit diagram illustrating a power cell in accordance with embodiments of the present disclosure.

FIG. 5 illustrates a schematic diagram of a power cell 200 in accordance with embodiments of the present disclosure. The power cell as shown in FIG. 1 may be implemented by the power cell 200 as shown in FIG. 5. It is to be understood that the power cell 200 is provided for an illustrative purpose only, without suggesting any limitation as to the scope of the present disclosure.

The power cell 200 includes a rectifier 110 and an inverter 120 coupled by a DC-link capacitor C. The rectifier 110 includes three half-bridges, each including a high-side switch and a low side switch. Each of the switches is coupled to a diode, which may be a body diode of the switch. The inverter 120 includes two half-bridges, each including a high-side switch and a low side switch. The switch may be an power switch such as an Insulated Gate Bipolar Transistor (IGBT).

Figure 6:
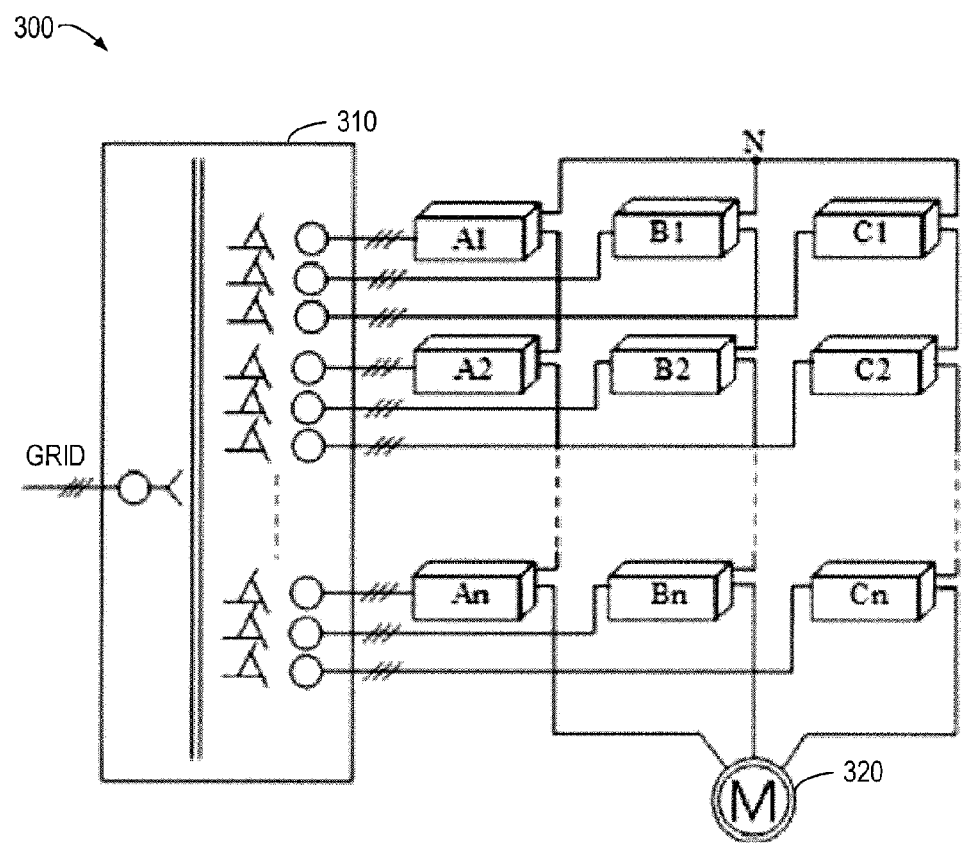
FIG. 6 is a schematic diagram illustrating a cascaded H-bridge-medium voltage drive (CHB-MVD) in accordance with embodiments of the present disclosure.

FIG. 6 is a schematic diagram illustrating a cascaded H-bridge-medium voltage drive (CHB-MVD) 300 in accordance with embodiments of the present disclosure. The CHB-MVD 300 includes a phase-shift transformer 310 coupled between the grid and power cells A1-An, B1-Bn, and C1-Cn. The power cells A1-An, B1-Bn, and C1-Cn are coupled to a motor 320 to drive the motor 320. Each of the power cells A1-An, B1-Bn, and C1-Cn may be implemented by the power cell 200 as shown in FIG. 5 and may be controlled by the controller 111 as shown in FIG. 1.

In the following, an embodiment is described with reference to an analytical representation of the system. The three phase secondary current references of the transformer for the power cell A1 as shown in FIG. 6 may be represented by $i_{iA2\_A1}^*$, $i_{iB2\_A1}^*$, and $i_{iC2\_A1}^*$. The fluctuating component $\tilde{p}_o$ and average component $\bar{p}_o$ of the motor side power $p_o$ may be adjusted by two different controllers 186 and 184 to generate different current references, respectively. The current reference $i_{od}^*$ includes a first part $\bar{i}_{od}^*$ corresponding to the average component $\bar{p}_o$ and a second part $\tilde{i}_{od}^*$ corresponding to the fluctuating component $\tilde{p}_o$. With independently adjusted controllers, two parts of the grid currents are adjusted separately to be adapted to the average and fluctuating output power on DC-link, respectively. The current reference $i_{od}^*$ and the reference $i_{dc}^*$ generated by the outer DC-link voltage control loop are combined to be the total active current reference $i_{id}*$, which is applied to adjust the grid side current to supply both the fluctuating component $\tilde{p}_o$ and average component $\bar{p}_o$ of the motor side power $p_o$.

As shown in equation (1), the coefficients $\bar{K}_p$ and $\tilde{K}_p$ are the proportional gains of the controllers 184 and 186 respectively. Equation (1) also shows an embodiment formula for the fluctuating component $\tilde{p}_o$, average component $\bar{p}_o$, and the current references $\bar{i}_{od}*, \tilde{i}_{od}*$ corresponding to the average and fluctuating components $\bar{p}_o$ and $\tilde{p}_o$, respectively.

$$\begin{bmatrix} i^*_{iA2\_A1} \\ i^*_{iB2\_A1} \\ i^*_{iC2\_A1} \end{bmatrix} = \frac{2u_{oa}i_{oa}}{3U^2_{im}} \begin{bmatrix} v_{iA} \\ v_{iB} \\ v_{iC} \end{bmatrix} = \quad (1)$$

$$\frac{[\underbrace{\bar{K}_p U_{om} I_{om} \cos\varphi}_{\bar{p}_o} - \underbrace{\tilde{K}_p U_{om} I_{om} \cos(2\omega_o t - \varphi)}_{\tilde{p}_o}]\begin{bmatrix}\sin(\omega_s t)\\ \sin(\omega_s t - 120°)\\ \sin(\omega_s t + 120°)\end{bmatrix}}{3U^2_{im}} =$$

$$\underbrace{\frac{U_{om}I_{om}\bar{K}_p}{3U^2_{im}}\begin{bmatrix}\sin(\omega_s t)\cos(\varphi)\\ \sin(\omega_s t - 120°)\cos(\varphi)\\ \sin(\omega_s t + 120°)\cos(\varphi)\end{bmatrix}}_{\bar{i}^*_{od}} -$$

$$\underbrace{\frac{U_{om}I_{om}\tilde{K}_p}{6U^2_{im}}\begin{bmatrix}\sin(\omega_s t + 2\omega_o t - \varphi) + \sin(\omega_s t - 2\omega_o t + \varphi)\\ \sin(\omega_s t + 2\omega_o t - \varphi - 120°) + \sin(\omega_s t - 2\omega_o t + \varphi - 120°)\\ \sin(\omega_s t + 2\omega_o t - \varphi + 120°) + \sin(\omega_s t - 2\omega_o t + \varphi + 120°)\end{bmatrix}}_{\tilde{i}^*_{od}}$$

By designing the controllers 184 and 186 differently, the average and fluctuating current supplied by the grid side can be adjusted flexibly and independently. DC-link fluctuating power can be supplied by the current reference generated by properly designed decoupling feed forward control, which reduces the fluctuating power and voltage ripple of DC-link. If the voltage ripple is kept at the same level, the capacitance of the DC-link capacitor could be much smaller, so the total weight and volume of the power conversion system such as the four-quadrat CHB-MVD are smaller.

Figure 7:
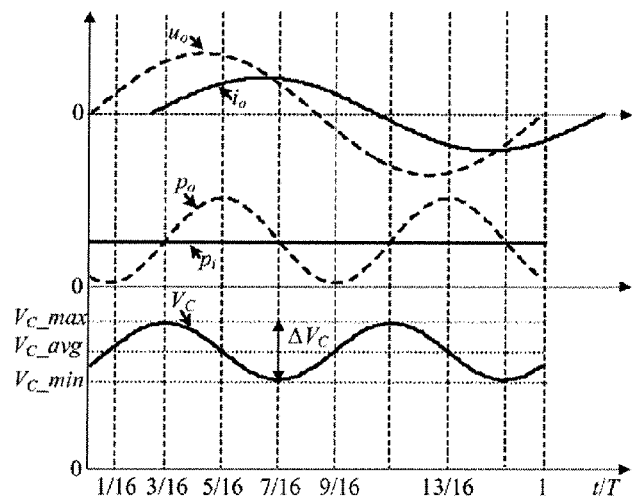
FIG. 7 is a plot illustrating a grid side power, a motor side power, and a DC-link voltage ripple of a power cell in accordance with embodiments of the present disclosure.

The embodiments of the present disclosure have been described above with reference to FIGS. 1-6. In order to better explain the improvements in the embodiments, FIG. 7 illustrates waveforms for the instantaneous power of the grid side, the motor side, and the DC-link voltage of a power cell without implementing the controller 111, in particular the feed forward controller 180, as shown in FIG. 1. In each power cell of the four-quadrant CHB-MVD 300, the phase angle of the motor side current $i_o$ lags the angle of the motor side voltage $u_o$ due to the existence of the winding resistors and inductors. Motor side instantaneous output power $p_o$ includes the average component $\bar{p}_o$ and the fluctuating component $\tilde{p}_o$. The sum of the three phase instantaneous input power of the grid side $p_i$ is always a constant component, because it is usually controlled to track $\bar{p}_o$. Therefore, there is a power difference $\bar{p}_o - p_i$ on DC-link corresponding to the fluctuating power component $\tilde{p}_o$. DC-link ripple $\Delta V_C$ mainly results from the fluctuating power component $\tilde{p}_o$ applied on the DC-link capacitor C.

Equation (2) shows the relationship between voltage ripple $\Delta V_C$ and the DC-link capacitance $C_B$. Referring to equation (2), with the same motor side voltage $U_{om}$ and motor side current $I_{om}$, that is, with same output fluctuating power component $\tilde{p}_o$, DC-link voltage ripple would increase as the DC-link capacitance decreases. Therefore, the fluctuating power component $\tilde{p}_o$ should be independently processed to reduce the voltage ripple $\Delta V_C$ on the DC-link.

$$\Delta V_c = \frac{U_{om}I_{om}}{\omega_o[V^2_{C\_max} - V^2_{C\_min}]} = \frac{U_{om}I_{om}}{2\omega_o C_B V_C \cos\varphi} \quad (2)$$

Aluminum electrolytic capacitor is one of the most common DC-link capacitors of the CHB-MVD. The power difference on DC-link causes problems to the DC-link capacitor. For example, voltage and current ripple would occur on DC-link due to the instantaneous power difference between the motor and grid side. DC-link voltage and current ripple would shorten the operating life of the capacitor. It may further cause the failure of the DC-link capacitor and then bring great challenges to the normal operation of the four-quadrant CHB-MVD. In addition, capacitance of the capacitors needs to be large enough to suppress these ripples, which means the DC-link capacitors to be more heavy and larger. Consequently, the cost and volume of the power conversion system such as CHB-MVD would increase.

To further validate the effectiveness of the output power decoupling feed forward control, simulations are performed with and without the feed forward controller 180 under two conditions: (1) with same DC-link capacitance and measuring the DC-link ripples in rated-load status, (2) with same DC-link ripple in rated-load status and measuring the DC-link capacitance. Table 1 shows the results or comparison of the two simulations.

In the first simulation condition, both the two systems apply the same DC-link capacitance (2.1 mF) and all the other conditions are the same except the control method. The rated-load status DC-link voltage ripple without the feed forward controller 180 is 110.5V (the average value of ten ripples between 2.4 s~2.5 s) while the ripple with the feed forward controller 180 is 81.5V. By decoupling the fluctuating component of the output power, the DC-link ripple can be reduced by 26.2% with the same DC-link capacitance.

In the second simulation condition, the DC-link capacitance difference is compared with and without the feed forward controller 180 under same rated-load status DC-link voltage ripple (81.5V). The DC-link capacitance without the feed forward controller 180 is 2.8 mF for 81.5V voltage ripple. The capacitance is reduced to 2.1 mF for the same voltage ripple with the feed forward controller 180 (reduced by 25%). The simulation results under both the two conditions show that the output power decoupling feed forward control could increase the flexibility on dealing with the DC-link fluctuating power and further decrease the voltage ripple especially in four-quadrant CHB-MVD.

TABLE 1

| DC-link capacitance or DC link voltage ripple comparison | | |
|---|---|---|
| Condition | DC-link voltage ripple (same DC-link capacitance 2.1 mF) | DC-link capacitance (same voltage ripple 81.5 V) |
| Without decoupling control | 110.5 V | 2.8 mF |
| With decoupling control | 81.5 V | 2.1 mF |

When applying the same DC-link capacitor, the DC-link voltage ripple will be reduced with the improved output power decoupling feed forward control. When the DC-link voltage ripple is designed at same voltage level, the DC-link capacitance could be reduced with the output power decoupling feed forward control. Reduced DC-link voltage ripple would be helpful to decrease the capacitor temperature rise and lengthen the life of the capacitor. Reduced DC-link capacitance may help decrease the power cell weight and space. Consequently, total weight and volume of the power conversion system such as CHB-MVD would be reduced. Additionally, smaller capacitor may also reduce the cost of the system.

Figure 8:
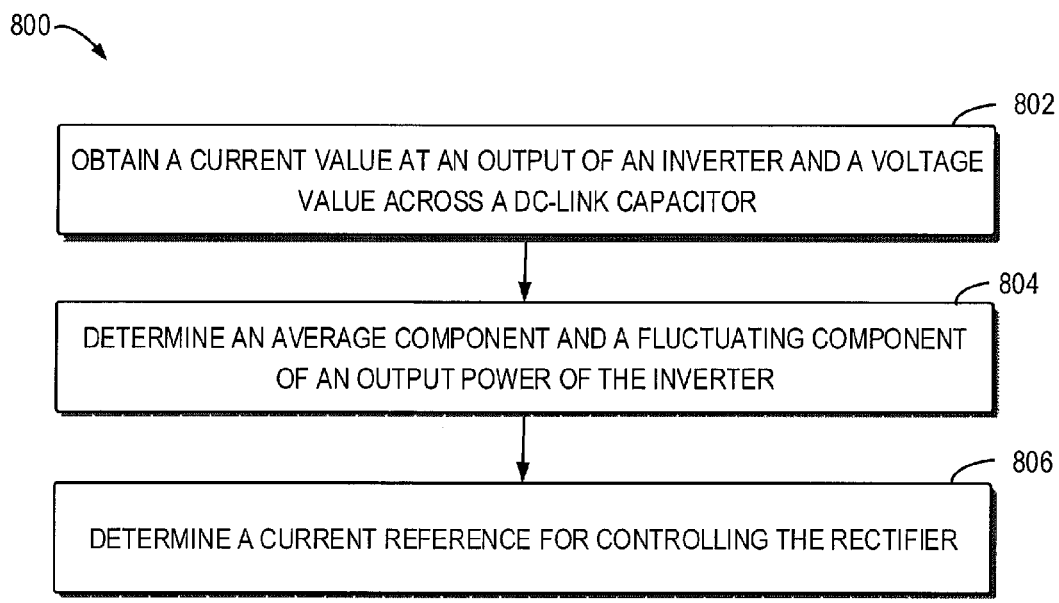
FIG. 8 is a flowchart illustrating a method in accordance with embodiments of the present disclosure.

FIG. 8 is a flowchart illustrating a method 800 in accordance with embodiments of the present disclosure. The method 800 may be implemented by the controller 111 as shown in FIG. 1.

At block 810, a current value at an output of an inverter and a voltage value across a DC-link capacitor may be obtained. The DC-capacitor coupled between a rectifier and the inverter. For example, the rectifier is a three-phase rectifier and the inverter is a single-phase inverter.

At block 820, an average component and a fluctuating component of an output power of the inverter may be determined based on the obtained current and voltage values.

In some embodiments, determining the average component and the fluctuating component of the output power comprises: decoupling the average component of the output power from the fluctuating component of the output power.

In some embodiments, decoupling the average component from the fluctuating component comprises: determining the average component of the output power based on the output power by a moving average filter (MAF); and determining the fluctuating component by decreasing the average component from the output power.

At block 830, a current reference may be determined based on the average component and the fluctuating component of the output power for controlling the rectifier.

In some embodiments, determining the current reference comprises: determining a first current from the average component of the output power, and determining a second current from the fluctuating component of the output power.

In some embodiments, determining the current reference comprises: adding the first and second currents to obtain a combined current; and determining the current reference based on the combined current.

In some embodiments, determining the first current comprises multiplying the average component of the output power with a first proportional gain and determining the second current comprises multiplying the fluctuating component of the output power with a second proportional gain.

In some embodiments, the method 800 further comprises causing an input current of the rectifier to track the current reference.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A system comprising:
a rectifier;
an inverter;
a DC-link capacitor coupled between the rectifier and the inverter; and
a controller configured to:
obtain a current value at an output of the inverter and a voltage value across the DC-link capacitor,
determine an average component and a fluctuating component of an output power of the inverter based on the obtained current and voltage values, and
determine a current reference for controlling the rectifier based on the average component and the fluctuating component of the output power.

2. The system of claim 1, wherein the controller comprises a de-coupler configured to decouple the average component of the output power from the fluctuating component of the output power.

3. The system of claim 2, wherein the de-coupler comprises:
a moving average filter (MAF) configured to output the average component of the output power based on the output power; and
an adder coupled to the MAF and configured to output the fluctuating component by decreasing the average component from the output power.

4. The system of claim 1, wherein the controller comprises:
a first controller unit configured to determine a first current from the average component of the output power; and
a second controller unit configured to determine a second current from the fluctuating component of the output power.

5. The system of claim 4, wherein the controller comprises an adder configured to add the first and second currents to obtain a combined current, and wherein the controller is further configured to determine the current reference based on the combined current.

6. The system of claim 4, wherein at least one of the first and second controller units is a Proportional Controller.

7. The system of claim 1, wherein the rectifier is a three-phase rectifier and the inverter is a single-phase inverter.

8. The system of claim 1, wherein the controller is further configured to adjust the rectifier to have an input current that tracks the current reference.

9. A method comprising:
obtaining a current value at an output of an inverter and a voltage value across a DC-link capacitor, the DC-link capacitor coupled between a rectifier and the inverter;
determining an average component and a fluctuating component of an output power of the inverter based on the obtained current and voltage values, and
determining a current reference for controlling the rectifier based on the average component and the fluctuating component of the output power.

10. The method of claim 9, wherein determining the average component and the fluctuating component of the output power comprises:
decoupling the average component of the output power from the fluctuating component of the output power.

11. The method of claim 10, wherein decoupling the average component from the fluctuating component comprises:
determining the average component of the output power based on the output power by a moving average filter (MAF); and
determining the fluctuating component by decreasing the average component from the output power.

12. The method of claim 9, wherein determining the current reference comprises:
    determining a first current from the average component of the output power, and
    determining a second current from the fluctuating component of the output power.

13. The method of claim 12, wherein determining the current reference comprises:
    adding the first and second currents to obtain a combined current; and
    determining the current reference based on the combined current.

14. The method of claim 12, wherein determining the first current comprises multiplying the average component of the output power with a first proportional gain, and
    wherein determining the second current comprises multiplying the fluctuating component of the output power with a second proportional gain.

15. The method of claim 9, wherein the rectifier is a three-phase rectifier and the inverter is a single-phase inverter.

16. The method of claim 9, further comprising:
    causing an input current of the rectifier to track the current reference.

17. A controller comprising:
    a de-coupler configured to:
        receive a current value at an output of an inverter and a voltage value across a DC-link capacitor, the DC-link capacitor coupled between a rectifier and the inverter; and
        decouple an average component of an output power from a fluctuating component of the output power, the output power being determined based on the received current and voltage values,
    wherein the controller is configured to determine a current reference for controlling the rectifier based on the average component and the fluctuating component of the output power.

18. The controller of claim 17, wherein the de-coupler comprises:
    a moving average filter (MAF) configured to output the average component of the output power based on the output power; and
    an adder coupled to the MAF and configured to output the fluctuating component by decreasing the average component from the output power.

19. The controller of claim 17, further comprising:
    a first controller unit configured to determine a first current from the average component of the output power, and
    a second controller unit configured to determine a second current from the fluctuating component of the output power.

20. The controller of claim 19, further comprising an adder configured to add the first and second currents to obtain a combined current, and
    wherein the controller is further configured to determine the current reference based on the combined current.

21. The controller of claim 19, wherein at least one of the first and second controller units is a Proportional Controller.

22. The controller of claim 17, wherein the rectifier is a three-phase rectifier and the inverter is a single-phase inverter.

23. The controller of claim 17, wherein the controller is further configured to adjust the rectifier to have an input current that tracks the current reference.

* * * * *